Feb. 15, 1966   M. A. STORCHHEIM   3,235,325
OZONE-GENERATING FIXTURE
Filed March 5, 1963
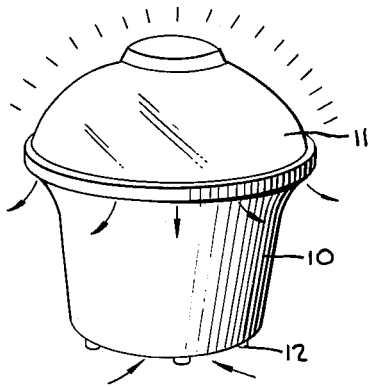
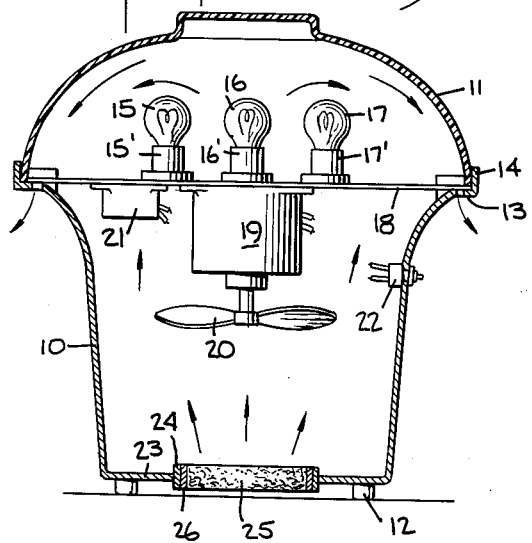
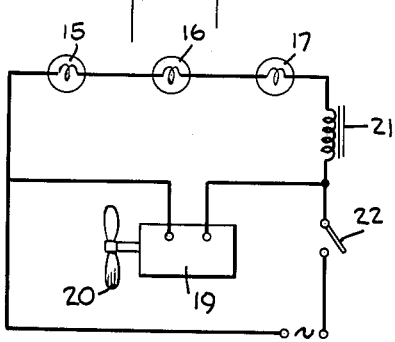
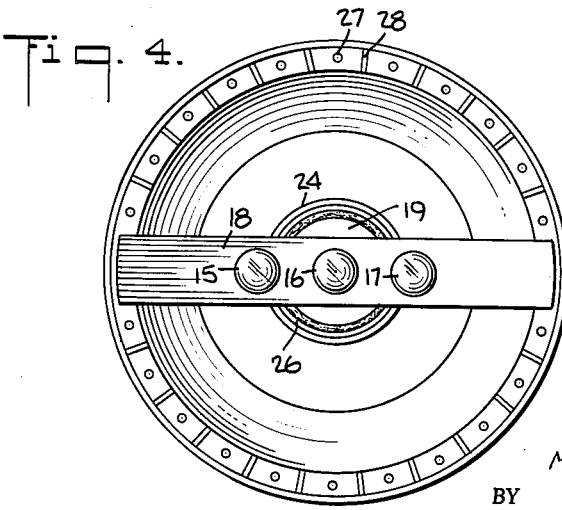
INVENTOR.
MORRIS A. STORCHHEIM
BY
Michael Ebert
ATTORNEY United States Patent Office
3,235,325
Patented Feb. 15, 1966

1

3,235,325
OZONE-GENERATING FIXTURE
Morris A. Storchheim, 73—30 244th St.,
Little Neck, N.Y.
Filed Mar. 5, 1963, Ser. No. 262,962
6 Claims. (Cl. 21—74)

This invention relates generally to ozone-generating devices, and more particularly to a fixture adapted to generate ozone efficiently and to discharge it uniformly throughout a room, as well as to provide low-level illumination.

The use of ozone-producing lamps to combat unpleasant odors and to create sanitary conditions within enclosed areas is well known. Such lamps are of the low-pressure mercury type and employ a special glass permeable to radiant energy over a broad range of wavelengths. The spectral distribution of commercially available lamps is such that a fraction of their total radiation is emitted in an ultraviolet region which acts on the air surrounding the bulb to create ozone from the oxygen therein and to produce negatively charged ions. Since ozone quickly decomposes into a stable molecule of oxygen and a free oxygen atom, the atom combines immediately with many substances to effect physical and chemical changes therein, including changes in their odor. It is such oxidation which is used to overcome odors arising in kitchens, bathrooms and closets, and to counteract odors produced from dampness and mildew.

The rays produced by low-pressure mercury lamps are also emitted in a region having germicidal effects as well as in the region of visible light. Since ultraviolet energy is harmful to the eyes, it is the usual practice to mount the lamps in shielding fixtures which completely conceal the lamps from the viewer.

The conventional fixture for ozone-producing lamps intended for purifying the atmosphere in a room, is constituted by a cabinet for housing the lamps, a fan being installed in the cabinet to draw air therein through an inlet port and to discharge ozone from an outlet louvre. Such fixtures are relatively inefficient, for they discharge the ozone in only one direction and fail therefore to bring about an effective distribution of the active ozone throughout the room. Moreover, these fixtures have a mechanical or utilitarian rather than a decorative appearance and do little to enhance the decor of the room.

Accordingly, it is the main object of this invention to provide an improved fixture for ozone-producing lamps which functions to draw air from a room and to circulate the air about the lamps, the resultant ozone being discharged omnidirectionally for optimum effect.

A significant feature of the invention is that the inherent design of the fixture is such as to afford the appearance of a lampstand, whereby the fixture may be used as an attractive addition to living rooms and other areas from from which such fixtures are ordinarily excluded.

Also an object of the invention is to provide a fixture of the above type wherein the air circulation chamber for the lamps is constituted by a translucent dome which provides a low-level illumination and at the same time filters out rays harmful to the observer.

Still another object of the invention is to provide a fixture wherein a suction fan serves to draw air through a fibrous filter which functions to remove pollutants from the atmosphere, thereby purifying the air in the room. A feature of the invention resides in the fact that the filter is adapted to retain volatile medicaments or aromatics which may thereby be diffused throughout the room.

Briefly stated, these objects are attained in a fixture comprising a cylindrical shell which is vertically supported, the shell having an annular ledge at its upper end on which is mounted a translucent dome. A bank of ozone-producing lamps is housed within the dome, and mounted therebelow in the shell is a suction fan which functions to draw air through a filter mounted at the bottom of the shell, the air being directly upwardly into the dome where it is activated by the rays emitted from the lamps, the resultant ozone being discharged omnidirectionally through a circumferential series of orifices in the annular ledge.

For a better understanding of the invention, as well as other objects and further features thereof, reference is made to the following detailed description to be read in conjunction with the accompanying drawing, wherein like elements in the several views are identified by like reference numerals and wherein:

FIG. 1 shows in perspective a fixture in accordance with the invention;

FIG. 2 is a vertical section taken through the fixture;

FIG. 3 is a schematic diagram of the fixture circuit; and

FIG. 4 is a plan view showing the ozone discharge openings of the fixture, the dome being removed.

Referring now to the drawings, the main components of the fixture in accordance with the invention are a generally cylindrical shell 10 and a dome 11 mounted thereon. The shell is preferably formed of a light-weight metal such as aluminum, or of a plastic of high strength, the shell being vertically mounted on pegs 12 which raise the lower end thereof slightly above the supporting surface to admit air therein.

The upper end of the shell 10 is flared outwardly to form an annular shelf or ledge 13, the ledge being surrounded by a circular flange 14. The dome 11 is hemispherically shaped, the rim of the dome resting on the ledge and fitting snugly within the flange 14. The dome is formed of a translucent material which is permeable to light rays but is effectively opaque to ultraviolet rays. For this purpose, milk glass or ground glass may be used, and the dome may be molded and patterned to afford a decorative appearance.

Mounted within the dome is a bank of three ozone-producing lamps 15, 16 and 17, the lamps being screwed within sockets 15', 16' and 17' supported on a mounting bracket or spider 18 which stretches across the upper end of the shell. Mounted on the underside of the bracket 18, centrally within the shell, is a motor 19 onto whose shaft is attached a suction fan 20. Also mounted on the bracket is an inductive or resistive ballast 21 which is connected in series with the three lamps, the series combination being connected, as shown in FIG. 3, through an on-off switch 22 to the A.-C. line. In practice, such standard ozone-producing lamps as OZ4S11 or G4S11, manufactured by the General Electric Company, may be used, each lamp operating at 10.5 volts and 350 milliamperes of current. Because these lamps are arc sources, they require a ballast to provide the rated voltage and current. Obviously, a greater or smaller number of lamps may be used.

The bottom end of the shell is enclosed by a circular base plate 23 having a central opening provided with a coupling ring 24. Receivable within the opening is a removable filter element 25 having an outer bezel 26 which fits within the coupling ring and is held therein by a snap lock or other suitable means. The filter is composed of fiber glass or other fibrous material adapted to trap and segregate particles in the air drawn therethrough. Before being inserted, the filter may be saturated in a medicated or aromatic solution.

In operation, when switch 22 is closed, the fan 20 and the ozone-producing lamps are turned on simultaneously. Air is sucked into the shell 10 through filter 25, the air being freed of particles and being in some instances medicated by the filter action. The air is directed upwardly by the fan action into dome 11, the air thereby being exposed to the rays from lamps 15, 16 and 17, whereby ozone and negatively charged ions are produced. The upwardly directed air, as indicated by the flow arrows, strikes the curved roof of the dome and is directed downwardly along the wall thereof toward the ledge 13.

Ledge 13, as best seen in FIG. 4, is provided with a circumferential series of openings 27 which in practice may be bordered by louvre plates 28, whereby the ozone is emitted in all directions and is uniformly distributed throughout the room. The curved and extended path of air flow within the dome prolongs the exposure time of the air and increases the amount of oxygen generated. The three lamps within the translucent glass dome provide a soft blue light, in the event the dome is whitish in composition, but this color may be altered by pigmenting the glass. Thus the dome acts as an attractive night light and also indicates whether the fixture is on or off. The dome may also be made of frosted or acid etched glass or any suitable plastic or resin impregnated fiberglass.

It is important to note that the fan acts to cool both the motor 19 and the ballast below the bracket, which otherwise might tend to run hot with a resultant reduction in efficiency. On the other hand, the bulbs, which to operate efficiently should be hot, lie above the bracket and are not directly cooled.

It will be appreciated that many changes may be made in the design of the fixture without altering the basic mode of operation. For example, the fixture may be made polygonal in form, with an interfitting shell and dome, and in this event, the annular discharge orifices will have a like configuration. It is intended, therefore, in the annexed claims to cover all such changes and modifications as wall within the true scope of the invention.

What is claimed is:

1. An ozone-producing fixture comprising a vertically mounted shell, a translucent dome supported on said shell and formed of a material which is permeable to light rays but effectively opaque to ultraviolet rays, the junction of said shell and dome being provided with a continuous series of orifices, an ozone-producing lamp supported within said dome in a position to illuminate the inside of said dome and a suction fan supported within said shell to draw air into said fixture through the bottom of said shell and upwardly into said dome where it is exposed to rays from said lamp to produce ozone which is discharged through said orifices.

2. An ozone-producing fixture comprising a vertically mounted cylindrical shell having an annular ledge at the upper end thereof provided with a continuous series of orifices, a translucent dome supported on said ledge and formed of a material which is permeable to light rays but effectively opaque to ultraviolet rays, an ozone-producing lamp supported within said dome in a position to illuminate the inside of said dome, and a suction fan supported within said shell to draw air into said fixture through the bottom of said shell and upwardly into said dome where it is exposed to rays from said lamp to produce ozone which is discharged through said orifices.

3. A fixture as set forth in claim 2, further including a filter mounted in the bottom of said shell.

4. An illuminated ozone-producing fixture comprising a vertically mounted shell whose upper end is flared outwardly to form an annular ledge having a circular flange, a hemispherical dome of translucent material resting on said ledge and formed of a material which is permeable to light rays but effectively opaque to ultraviolet rays, the rim of said dome lying against said flange, said ledge having a circumferential series of orifices to discharge ozone omnidirectionally from said dome, an air filter mounted at the bottom of said shell, bracket means at the upper end of said shell to support a bank of ozone-producing lamps within said dome, a motor mounted below said bracket means and provided with a suction fan which rotates within said shell to draw air through said filter upwardly into said dome where it is exposed to rays from said lamps to produce ozone which is discharged through said openings.

5. A fixture as set forth in claim 4, wherein said dome is formed of milk glass.

6. A fixture as set forth in claim 4, wherein said filter is composed of fiber glass held within a bezel which is insertable within a coupling ring in the bottom of said shell.

References Cited by the Examiner

UNITED STATES PATENTS 2,989,632  6/1961  Olson et al. _____ 21—74

FOREIGN PATENTS 151,732  6/1953  Australia.

MORRIS O. POLK, *Primary Examiner.*